United States Patent
Kitz et al.

[11] Patent Number: 5,979,064
[45] Date of Patent: Nov. 9, 1999

[54] STRING TRIMMER WITH FIXED STRING HEAD

[75] Inventors: Robert E. Kitz, Rock Hill, S.C.; Qing H. Guo, Charlotte, N.C.

[73] Assignee: Deere & Company, Charlotte, N.C.

[21] Appl. No.: 08/932,165

[22] Filed: Sep. 17, 1997

[51] Int. Cl.[6] .................................................. A01D 34/67
[52] U.S. Cl. ............................................. 30/347; 30/276
[58] Field of Search .............................. 30/276, 295, 347

[56] References Cited

U.S. PATENT DOCUMENTS

| | | | |
|---|---|---|---|
| 4,054,992 | 10/1977 | Ballas et al. | 30/276 |
| 4,062,115 | 12/1977 | Lee | 30/276 |
| 4,190,954 | 3/1980 | Walto | 30/347 |
| 4,229,882 | 10/1980 | Chartier | 30/276 |
| 4,295,324 | 10/1981 | Frantello et al. | 30/276 |
| 4,362,007 | 12/1982 | Kennedy et al. | 56/295 |
| 4,571,831 | 2/1986 | White, III | 30/276 |
| 4,685,279 | 8/1987 | Gullett | 56/12.7 |
| 4,726,176 | 2/1988 | McGrew | 56/12.7 |
| 4,856,194 | 8/1989 | Lee | 30/276 |
| 5,023,998 | 6/1991 | Masciarella et al. | 30/276 |
| 5,048,278 | 9/1991 | Jones et al. | 56/295 |
| 5,197,264 | 3/1993 | Lacey | 30/276 |
| 5,303,476 | 4/1994 | Tuggle | 30/347 |
| 5,398,416 | 3/1995 | Mackey | 30/347 |
| 5,406,708 | 4/1995 | Stephens et al. | 30/276 |
| 5,430,943 | 7/1995 | Lee | 30/347 |
| 5,433,006 | 7/1995 | Taguchi | 30/276 |
| 5,493,785 | 2/1996 | Lawrence | 30/276 |
| 5,615,543 | 4/1997 | Caffey et al. | 56/295 |
| 5,651,418 | 7/1997 | Jerez | 30/276 |

FOREIGN PATENT DOCUMENTS

WO 97 06665  2/1997  WIPO .

OTHER PUBLICATIONS

Advertisement, Weed Hog, E&L Lawn Service Products Company, 5 pages.
Advertisment, Weed Whip, RPM Equipment & Supply Company, 1995, 8 pages.

*Primary Examiner*—Rinaldi I. Rada
*Assistant Examiner*—Gyounghyun Bae
*Attorney, Agent, or Firm*—Perman & Green, LLP

[57] ABSTRACT

A string trimmer head having a frame and a flexible cutting member attached to the frame. The frame is a one-piece member with two hook sections on opposite sides of the frame. The hook sections each have a receiving slot with an entrance facing towards a substantially closed bottom side of the frame and a closed end at a substantially open top side of the frame. In one embodiment the receiving slots have different widths to accommodate attachment of different diameter flexible cutting members to the frame. In another embodiment, the frame is adapted to have either one flexible cutting member attached to it or two flexible cutting members attached to it with the flexible cutting member(s) extending from the frame in uniform patterns in either arrangement.

19 Claims, 4 Drawing Sheets

STRING TRIMMER WITH FIXED STRING HEAD

BACKGROUND OF THE INVENTION

1. Field of the Invention

The present invention relates to vegetation cutters and, more particularly, to a rotary cutting head with a fixed flexible cutting member.

2. Prior Art

String trimmers which use a rotary head with flexible cutting lines made of plastic or metal are generally well known in the art. U.S. Pat. No. 5,433,006 discloses a rotary mowing head with a one-piece frame and two cutting lines. The cutting lines are located in tapered spaces and the frame has hooks for the cutting lines. U.S. Pat. No. 4,190,954 discloses a cutting head with two cutting lines attached to the top side of the frame.

SUMMARY OF THE INVENTION

In accordance with one embodiment of the present invention a string trimmer head is provided comprising a frame and a flexible cutting member. The frame has a one-piece member with a substantially open top side, a substantially closed bottom side, a perimeter wall with side holes therethrough, a center section with a mounting hole, and a hook section facing towards the bottom side from the top side. The hook section has a receiving slot with an entrance facing towards the bottom side and a closed end at the top side. The flexible cutting member is located in the slot and extends through the perimeter wall at the side holes. The flexible member is attached to the hook section from a direction of the top side of the frame.

In accordance with another embodiment of the present invention a string trimmer head frame is provided having a one-piece member with two hook sections. Each hook section has a receiving slot. The receiving slot of a first one of the hook sections has a first width and the receiving slot of a second one of the hook sections has a second different width. The different width receiving slots allow two different diameter flexible cutting members to be attached to the frame in the slots at the hook sections.

In accordance with another embodiment of the present invention a string trimmer head frame is provided having a mounting section for mounting the frame to a string trimmer and means for connecting a flexible member to the frame. The means for connecting a flexible member to the frame has a first hook and is adapted to connect a first flexible member at a first position on the frame with the flexible member extending out of the frame in opposite directions. The means for connecting a flexible member to the frame also has a second hook to alternatively connect a second flexible member at a second position on the frame.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
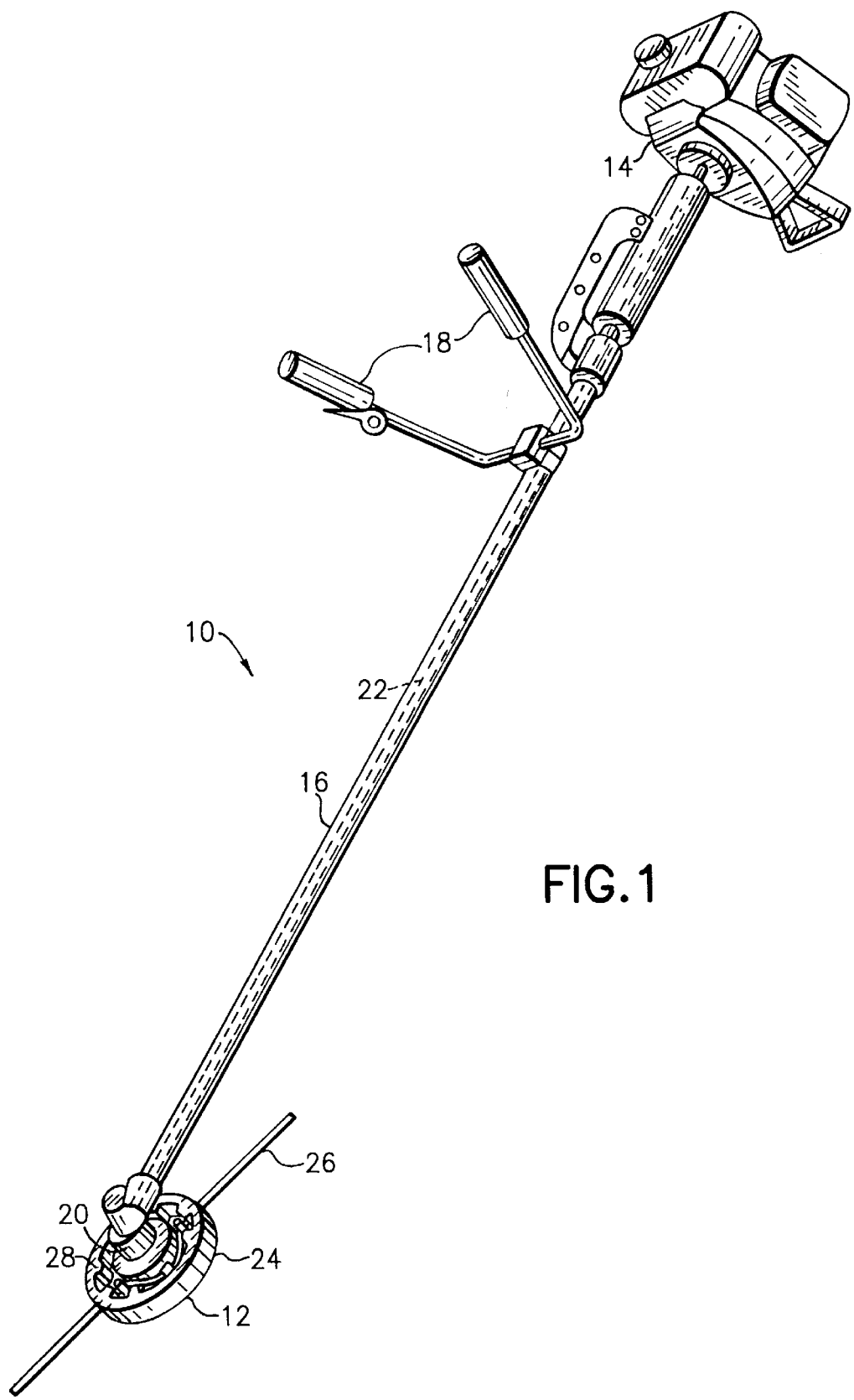
FIG. 1 is a perspective view of a string trimmer having a rotary cutting head incorporating features of the present invention.

Referring to FIG. 1, there is shown a perspective view of a string trimmer 10 having a rotary cutting head 12 incorporating features of the present invention. Although the present invention will be described with reference to the embodiments shown in the drawings, it should be understood that the present invention could be embodied in many different types of alternative embodiments. In addition, any suitable size, shape or type of elements or materials could be used.

Figure 3:
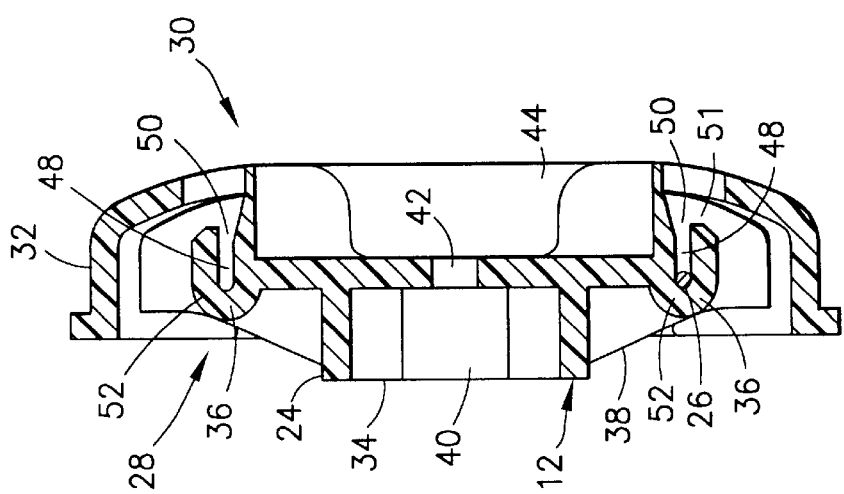
FIG. 3 is a cross-sectional view of the rotary cutting head shown in FIG. 2 taken along line 3—3.
Figure 2:
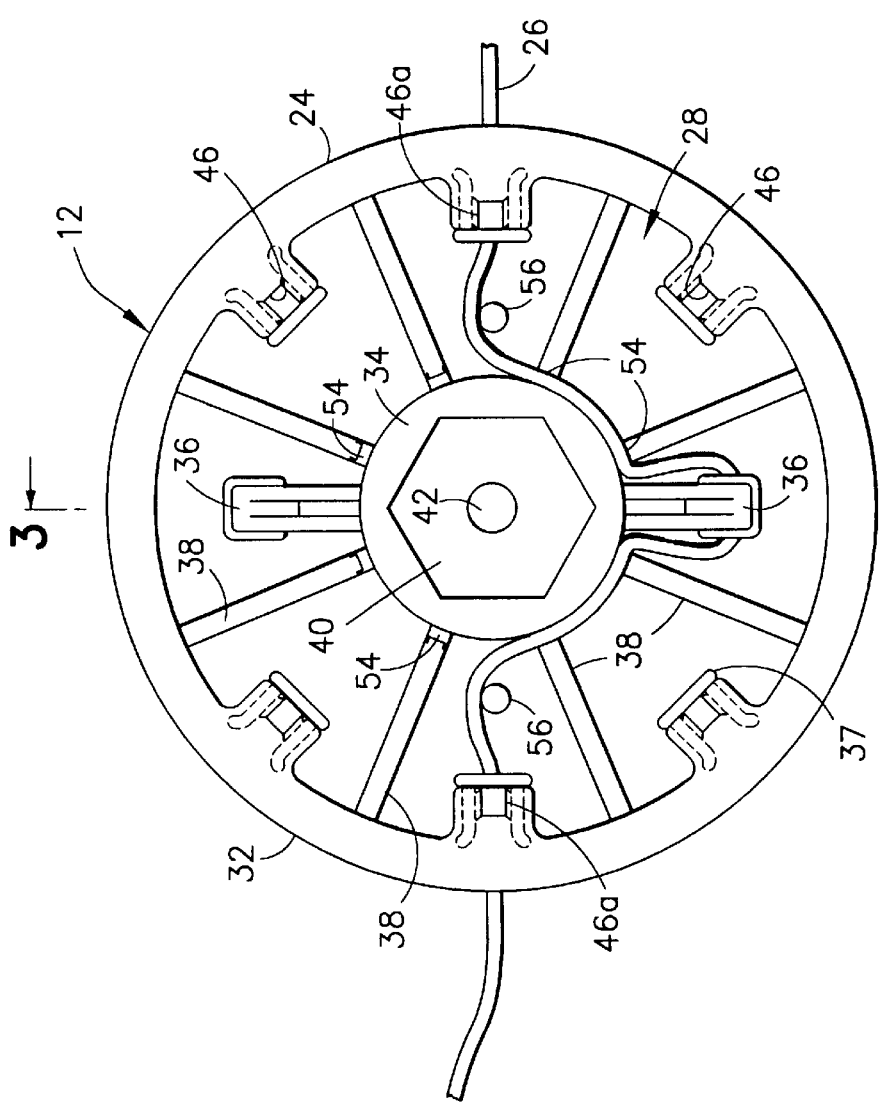
FIG. 2 is a top plan view of the rotary cutting head shown in FIG. 1.
Figure 4:
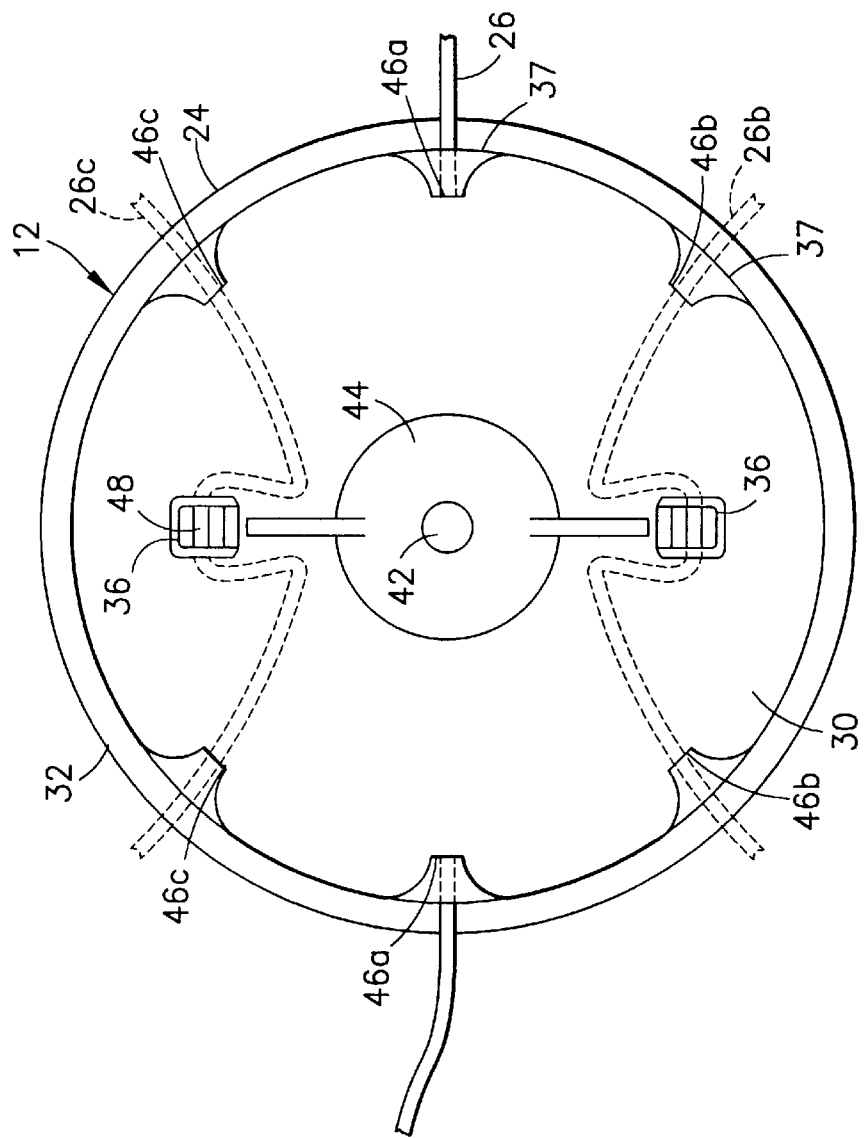
FIG. 4 is a bottom plan view of the rotary cutting head shown in FIG. 2.

The string trimmer 10 generally comprises an internal combustion engine 14, a shaft 16, handles 18, and a mount 20 for mounting the head 12 to the string trimmer 10. A drive shaft 22 extends from the engine 14, through the shaft 16, to the mount 20. In an alternate embodiment, the string trimmer could have an electric motor rather than the engine 14. Referring also to FIGS. 2–4, the rotary cutting head 12 is shown. The head generally comprises a frame 24 and a flexible cutting member 26. The head 12 is a fixed string type head (i.e.: there is no line feeding mechanism for feeding line from a spool of cutting line). When the flexible cutting member 26 becomes worn, it is removed from the frame 24 and replaced with a new one. The frame 24 is a one-piece member preferably made from a molded plastic or polymer material. The frame 24 has a substantially open top side 28, a substantially closed bottom side 30, a perimeter wall 32, a center section 34, hook sections 36, and ribs 38. The center section 34 forms a mounting section for mounting the head 12 to the mount 20. The center section 34 has a hexagon shaped area 40 at the top side 28 for receiving and interlocking with a drive connector (not shown) of the mount 20. In alternate embodiments, the area 40 could be provided with other types of shapes intended to key or interlock with the drive connector. A through hole 42 extends through the center section 34 to a recess 44 on the bottom side 30. A bolt (not shown) from the drive connector extends through the hole 42. A nut (not shown) is attached to the bolt and is located in the recess 44 to attach the head 12 to the drive connector.

In the embodiment shown, the perimeter wall 32 has six side holes 46 extending therethrough. The six side holes 46 are arranged as three pairs of holes as further understood below. In the embodiment shown, the side holes 46 are preferably provided with eyelets 37 fixedly mounted in the holes. However, in alternate embodiments, the eyelets need not be provided. The two hook sections 36 face towards the bottom side from the top side. Each hook section has a receiving slot 48 with an entrance 50 facing towards the bottom side and a closed end 52 at the top side 28. The width of the slots 48 are uniform along a majority of the length of the slots. The ribs 38 extend in a radial direction from the center action 34 to the perimeter wall 32. Each rib 38 has a rib slot 54 extending into the rib from the top side. The frame 24 also has two pin sections 56 located in front of the first pair of side holes 46a.

The flexible cutting member 26 is mounted to the frame 24 from the top side 18 of the frame. Thus, the frame 24 does not need to be removed from the mount 20 in order to change the flexible cutting member 26. The cutting member 26 is first hooked onto one of the hook sections 36. The center of the cutting member 26 is passed through area 51, into entrance 50, and into the slot 48. The width of the slot 48 is substantially the same as, or slightly smaller than, the diameter of the cutting member 26 such that a frictional interference fit is formed between the hook section 36 and the cutting member 26. The rib slots 54 also have the same width. The cutting member 26 is then thread through the first pair of side holes 46a and located in the rib slots 54 on one side of the frame. The tortuous path of the cutting member 26 on the frame and the frictional interference fit of the cutting member 26 in the slots 48, 54, fixedly and removably mounts the cutting member to the frame 24.

In addition to mounting the single cutting member 26 to the frame 24, the frame is also adapted to mount two separate cutting members thereto. More specifically, as illustrated in FIG. 4, because the frame 24 has two hook sections 36 and the two other pairs of side holes 46b, 46c, two separate cutting members 26b, 26c can be mounted to the frame 24. Thus, the frame 24 is adapted to alternatively receive a cutting member in a first position or two of the cutting members in second positions. Attachment of the cutting member(s) to the frame can be configured as desired by the user. In both configurations the cutting members extend out of the frame in generally equally spaced angles from each other.

Figure 5:
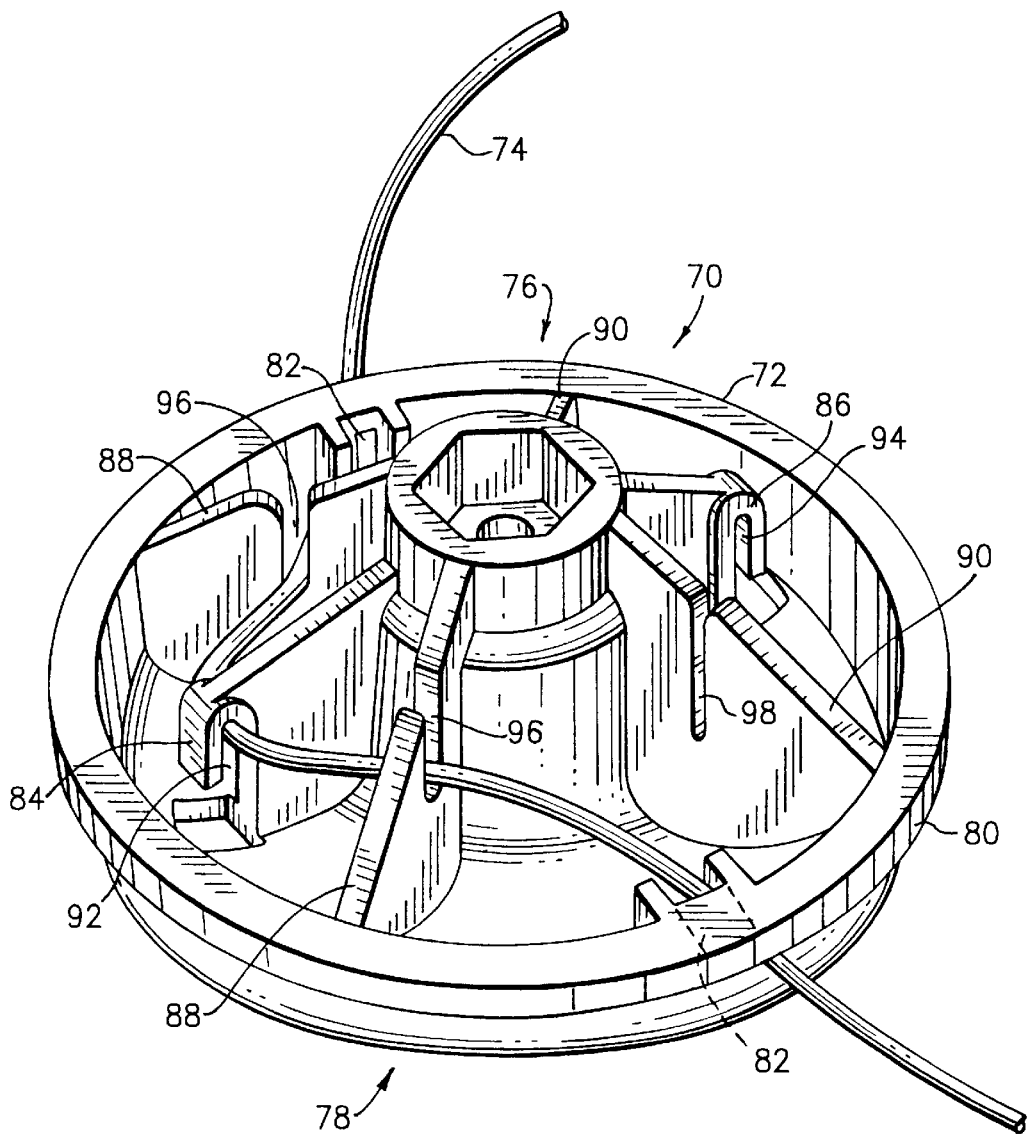
FIG. 5 is a perspective view of an alternate embodiment of the present invention.

Referring now to FIG. 5, an alternate embodiment of the present invention is shown. In this embodiment, the rotary cutting head 70 has a frame 72 and a flexible cutting member 74. The frame 72 is a one-piece member preferably made of molded plastic. The frame 72 has a substantially open top side 76, a substantially closed bottom side 78, and a perimeter wall 80. The wall 80 has two holes 82. The frame 72 includes two hook sections 84, 86 and two sets of ribs 88, 90 located on opposite sides of the frame. The first hook section 84 has a receiving slot 92 having a first width along a majority of its length, such as a width of about 0.105 inch. The second hook section 86 has a receiving slot 94 with a second different width along a majority of its length, such as about 0.080 inch. However, any suitable widths could be provided. The ribs 88, 90 also have rib slots 96, 98. The first rib slots 96 have a width about the same as the width of the slot 92. The second rib slots 98 have a width about the same as the width of the slot 94. With this embodiment the frame 72 is adapted to hold two different size diameter flexible cutting members. A first size diameter flexible cutting member can be mounted in slots 92 and 96. Alternatively, a second smaller size diameter flexible cutting member can be mounted in slots 94 and 98. This gives the user added configuration flexibility not previously available.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A string trimmer head comprising:
    a frame having a one-piece member with a substantially open top side, a substantially closed bottom side, an outer perimeter wall with side holes therethrough, a center section with a mounting hole, and a hook section facing towards the bottom side from the top side, the hook section having a receiving slot with an entrance facing towards the bottom side, a closed end at the top side, and a lateral passage area between the hook section and the bottom side into the entrance; and
    a flexible cutting member located in the slot and extends through the outer perimeter wall at the side holes,
    wherein the flexible member is attached to the hook section from a direction of the top side of the frame after first being laterally passed through the lateral passage area to the entrance.

2. A string trimmer head as in claim 1 wherein the frame has two of the hook sections located on opposite sides of the center section.

3. A string trimmer head as in claim 2 wherein the perimeter wall has three pairs of the side holes, a first pair of the side holes and a first one of the hook sections mounting the flexible member to the frame or alternatively a second and third pair of the side holes and the two hook sections mounting two of the flexible members to the frame.

4. A string trimmer head as in claim 2 wherein the two hook sections each have a respective receiving slot, the receiving slots having respective different widths to receive flexible members with different diameters.

5. A string trimmer head as in claim 4 wherein the frame comprises radially extending ribs between the hook sections and side holes with rib slots extending into the ribs from the top side of the frame, the rib slots having different widths on opposite sides of the center section.

6. A string trimmer head as in claim 1 wherein the frame comprises radially extending ribs between the hook sections and side holes with rib slots extending into the ribs from the top side of the frame.

7. A string trimmer head frame having a one-piece member with two hook sections, each hook section having a receiving slot, the receiving slot of a first one of the hook sections having a first width and the receiving slot of a second one of the hook sections having a second different width, wherein the different width receiving slots allow two different diameter flexible cutting members to be attached to the frame in the slots at the hook sections.

8. A frame as in claim 7 wherein two side holes extend through a perimeter wall of the frame on opposite sides of the frame, and wherein the two different diameter flexible members alternatively extend through the two side holes.

9. A frame as in claim 8 wherein the frame comprises radially extending ribs between the hook sections and the side holes with rib slots extending into the ribs from a top side of the frame.

10. A frame as in claim 9 wherein the rib slots have different widths on opposite sides of the frame.

11. A frame as in claim 7 wherein the hook sections each have an entrance facing towards a bottom side of the frame and a closed end of a top side of the frame.

12. A frame as in claim 7 wherein the receiving slots are individually uniform in width along a majority of their lengths.

13. A string trimmer head as in claim 1 further comprising eyelets fixedly mounted to the frame in the side holes.

14. In a string trimmer head frame having a mounting section for mounting the frame to a string trimmer, and means for connecting a flexible member to the frame, wherein the improvement comprises:
    the means for connecting a flexible member to the frame having a first hook and being adapted to connect a first flexible member at a first position on the frame with the flexible member extending out of the frame in opposite directions, and having a second hook to alternatively connect a second flexible member at a second position on the frame, wherein the frame comprises radially extending ribs between the hook sections and side holes with rib slots extending into the ribs from the top side of the frame.

15. A frame as in claim 14 wherein the frame is a one-piece member with a substantially open top side, a substantially closed bottom side, a perimeter wall with side holes therethrough, a center section with a mounting hole, and a hook section facing towards the bottom side from the top side, the hook section having a receiving slot with an entrance facing towards the bottom side and a closed end at the top side.

16. A frame as in claim 15 wherein the receiving slots of the two hook sections have different widths to receive flexible members with different diameters.

17. A frame as in claim 16 wherein the rib slots have different widths on opposite sides of the frame.

18. A frame as in claim 15 wherein the receiving slots are individually uniform in width along a majority of their lengths.

19. A string trimmer head as in claim 14 further comprising eyelets fixedly mounted to the frame in the side holes.

* * * * *